United States Patent [19]
Robinson

[11] Patent Number: 5,630,687
[45] Date of Patent: May 20, 1997

[54] TAMPER RESISTANT VALVE CAP

[76] Inventor: Robert R. Robinson, 695 Blaine Way, Hayward, Calif. 94544

[21] Appl. No.: 506,012

[22] Filed: Jul. 24, 1995

[51] Int. Cl.$^6$ .................................................. F16B 37/14
[52] U.S. Cl. .................. 411/372; 411/393; 411/429; 411/910
[58] Field of Search .................. 411/371-374, 429, 411/431, 910, 393, 396

[56] References Cited

U.S. PATENT DOCUMENTS

| D. 86,154 | 2/1932 | Broecker . | |
|---|---|---|---|
| D. 255,540 | 6/1980 | Baylis | D8/331 |
| D. 306,420 | 3/1990 | Robinson | D12/153 |
| 531,701 | 1/1895 | Smith | 411/373 |
| 1,486,448 | 3/1924 | Norlund | 411/910 |
| 2,633,176 | 3/1953 | Fears | 411/372 |
| 3,152,818 | 10/1964 | Ivins | 411/374 |
| 4,540,322 | 9/1985 | Coffia | 411/910 |
| 4,544,054 | 10/1985 | Brown | 411/393 |
| 4,645,422 | 2/1987 | Brushaber | 411/910 |
| 4,869,633 | 9/1989 | Hayashi | 411/368 |
| 5,325,981 | 7/1994 | Klomhaus et al. | 220/212 |

FOREIGN PATENT DOCUMENTS 170803  11/1921  United Kingdom .................. 411/396

Primary Examiner—Flemming Saether
Attorney, Agent, or Firm—Thomas Schneck

[57] ABSTRACT

A theft resistant valve cap including a liner adapted for threaded engagement with a standard pneumatic tire stem valve, a sleeve rotatably mounted with the liner to shroud it an interlocking feature to selectively prevent axial displacement between the liner and the sleeve. The interlocking feature includes a screw threaded into an aperture in the sleeve, and an annular channel on the liner, positioned to receive the screw. The annular channel has an upper surface, a lower surface and an inner surface disposed between the upper and lower surfaces. The screw is moved so that it extends into the channel resting proximate to the upper surface, but clear of both said lower and inner surfaces. In this fashion, the liner and the sleeve are in a fixed axial position with respect to each other; however, the rotatability of the sleeve with respect to the liner is maintained, preventing removal of the liner from the stem. The rotational movement of the sleeve prevents removing the liner and/or the sleeve from the valve stem.

19 Claims, 6 Drawing Sheets

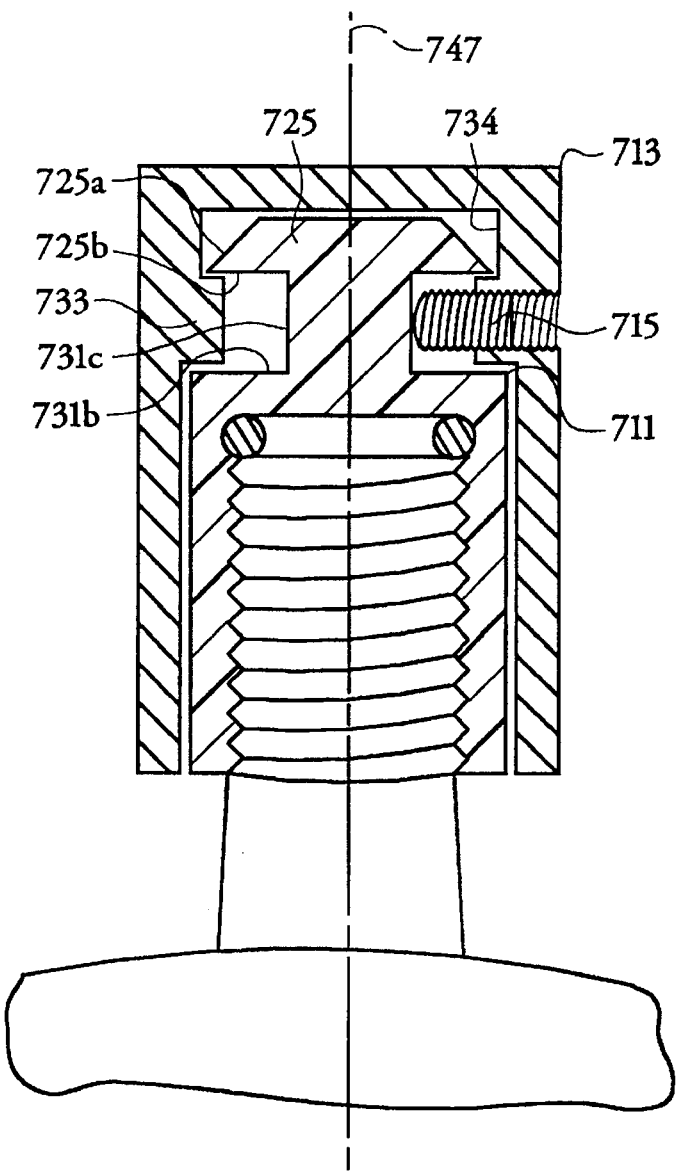
FIG. 12
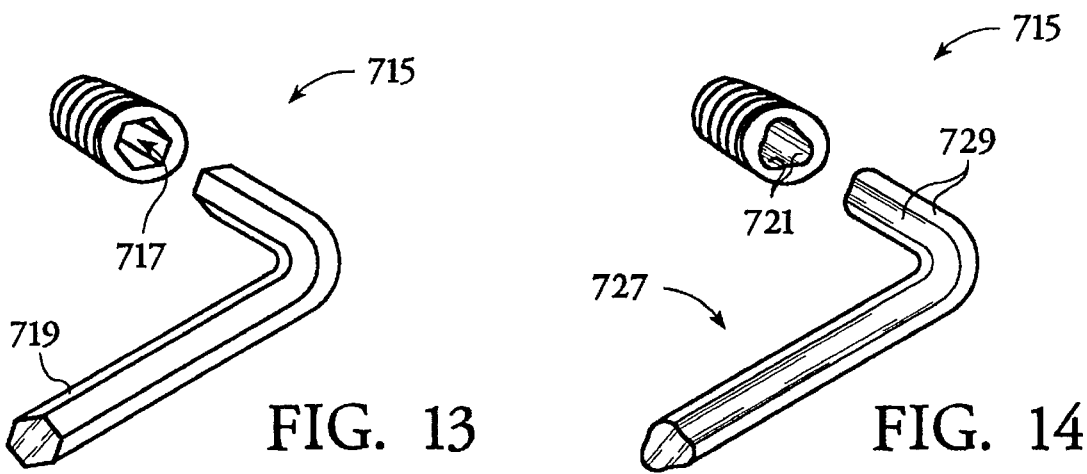
FIG. 13
FIG. 14

5,630,687

TAMPER RESISTANT VALVE CAP

TECHNICAL FIELD

The present invention pertains to the field pneumatic valves. Specifically, the present invention pertains to an improved cap for use with a standard pneumatic tire stem valve.

BACKGROUND ART

Valve caps for standard pneumatic tire valves have traditionally been employed to protect the valve stem from degrading due to corrosion caused by exposure to the environment. The traditional valve caps were typically manufactured from inexpensive polymer-based materials. As such, they were relatively inexpensive and weren't aesthetically appealing. A drawback with the traditional valve cap is that they were easily removed, allowing access to the valve actuating member of the valve stem so air could be released from the tire by unauthorized persons.

In recent years, designer caps have come into existence. One such cap is described in U.S. Pat. No. Des. 306,420. The designer caps are aesthetically appealing to the average person and are much more expensive than the traditional valve caps. Typically, a single designer valve cap can cost several dollars. A major drawback with the designer caps is that they are easily removed from the valve stem. Similar to the traditional valve caps, this allows unauthorized persons to release air from the tire. More significant, however, it that easy removal raises the possibility that the cap would be stolen, due to its aesthetic appeal. This is a major factor in dissuading purchasers from investing in designer caps.

It is an object, therefore, of the present invention to provide a theft resistant valve cap.

It is another object of the present invention to provide a valve cap that limits accessibility to the actuating member of a pneumatic valve stem.

SUMMARY OF THE INVENTION

These objects have been achieved by providing a valve cap including a liner adapted for threaded engagement with a standard pneumatic tire stem valve, a sleeve rotatably mounted with the liner to shroud it and an interlocking feature to selectively prevent axial displacement between the liner and the sleeve. In one embodiment, the interlocking feature includes a screw threaded into an aperture in the sleeve, and an annular channel on the liner, positioned to receive the screw. The annular channel has an upper surface, a lower surface and an inner surface disposed between the upper and lower surfaces. The screw is moved so that it extends into the channel resting proximate to the upper surface, but clear of both the lower and inner surfaces. In this fashion, the liner and the sleeve are in a fixed axial position with respect to each other; however, the rotatability of the sleeve with respect to the liner is maintained, preventing removal of the liner from the stem. The rotational movement of the sleeve prevents removing the liner from the valve stem, as well.

In another embodiment, an interlocking feature includes an annular ridge disposed about said liner and an annular channel positioned on the inner surface of the sleeve to receive the annular ridge. A screw may be threaded into an aperture of the sleeve as described above. In this fashion, the screw may be extended to fix both the angular and axial positions of the liner and the sleeve with respect to one another. This allows the liner to be placed on, or removed from, the valve stem.

BRIEF DESCRIPTION OF THE DRAWINGS

FIG. 12 is a cross-section view of the invention of FIGS. 1 and 2 in accord with an alternate embodiment.

FIGS. 13 and 14 are perspective views of alternate embodiments of a key and lock used in accord with the present invention.

BEST MODE FOR CARRYING OUT THE INVENTION

Figure 1:
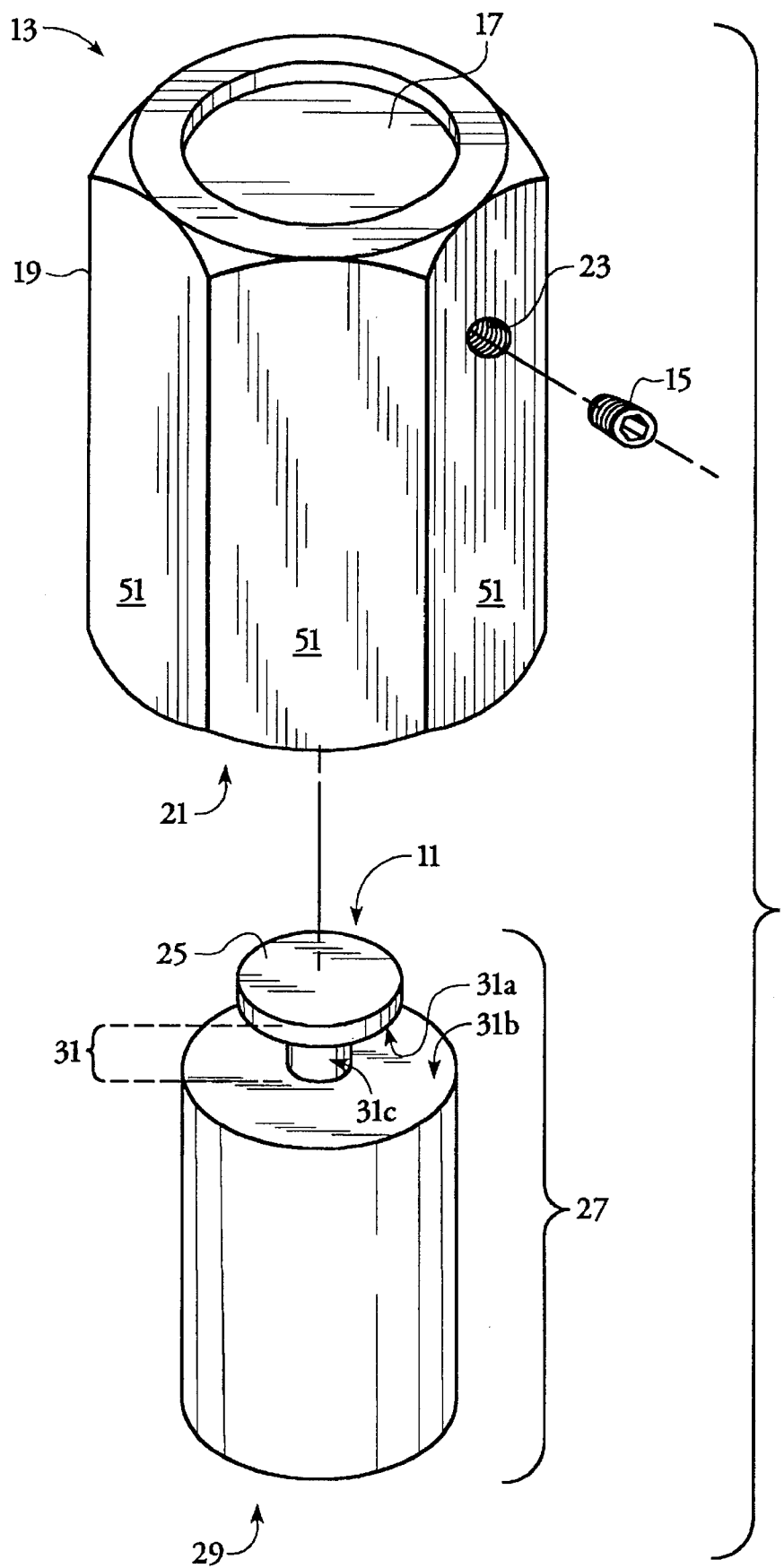
FIG. 1 is an exploded perspective view of the present invention in accord with the preferred embodiment.
Figure 2:
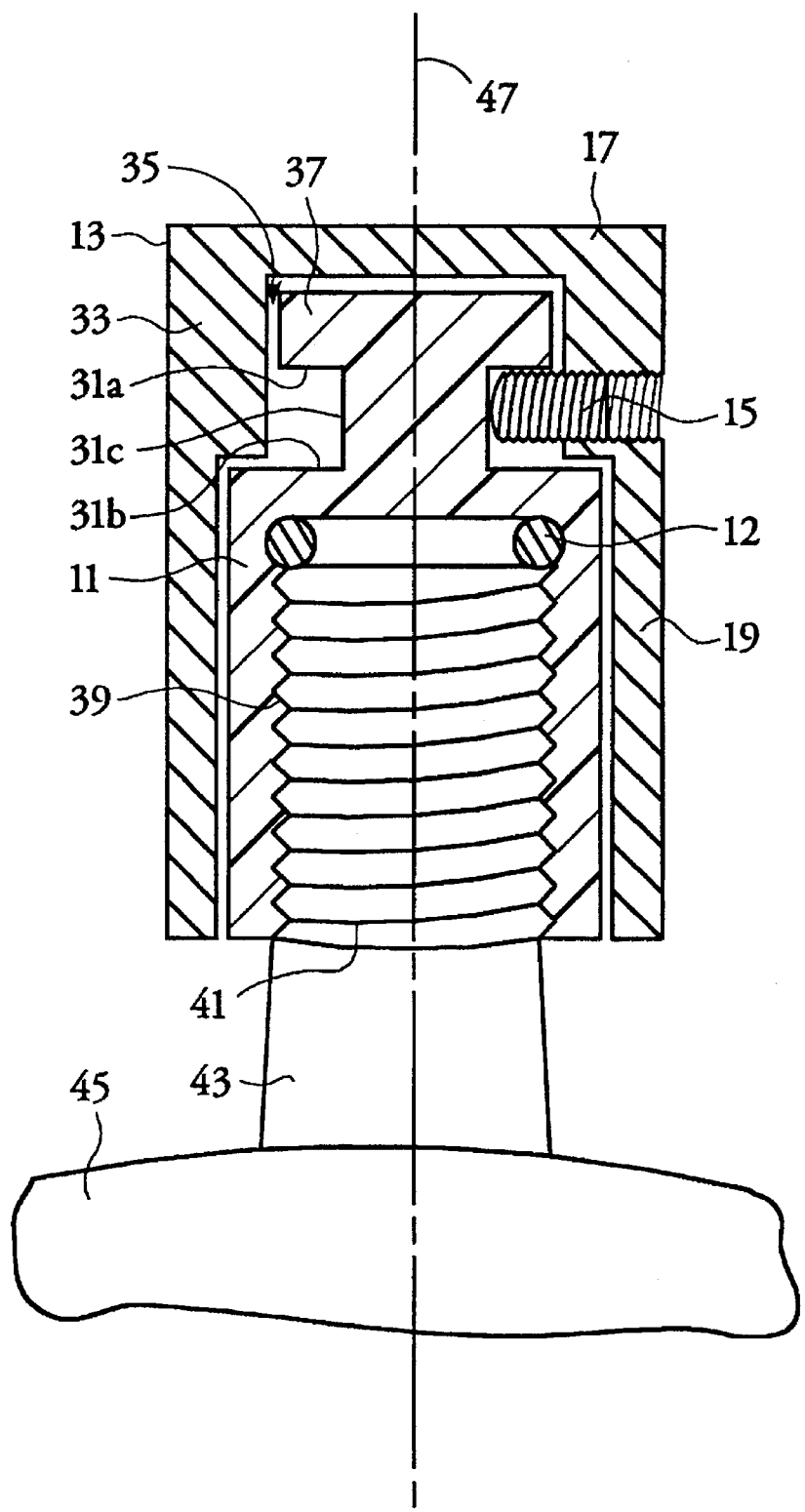
FIG. 2 is a cross-section view of the invention shown in FIG. 1 mounted onto a pneumatic valve stem of a standard automobile tire.

With reference to both FIGS. 1 and 2, the preferred embodiment of the present invention is shown as including a hollow liner 11, a hollow sleeve 13 and a reciprocating member 15, such as a screw. The sleeve 13 has a top portion 17 and a sidewall 19 extending therefrom, terminating in an opening 21. An aperture 23, formed to receive the reciprocating member 15, extends completely through the sidewall 19. The liner 11 includes an upper portion 25 and a side-section 27 extending therefrom, terminating in an orifice 29. The side section 27 includes an annular channel 31 having upper 31a and lower 31b surfaces, extending perpendicular to the side section 27, as well as an inner surface 31c extending therebetween. The liner 11 is shaped to pass through the opening 21 and fit within the sleeve 13, so that the sleeve 13 is coaxial with the liner 11. With the liner 11 received within the sleeve 13, the channel 31 is positioned to receive the reciprocating member 15. The top portion 17 of the sleeve covers the upper portion 25 of the liner 17 and the sidewall 19 may extend so as to completely cover the side-section 27. In this manner, the sleeve 13 is said to shroud the liner. The sidewall 19 may be longer or shorter than the side-section 27. However, it is preferred that the sidewall 19 be coextensive with the side-section 27.

Preferably, the portion of the sidewall 19 containing the aperture 23 is thicker than the remaining portions of the sidewall 19, forming a bulwark 33. This provides a stronger and more durable area in which to support the reciprocating member 15, while minimizing the materials necessary to construct the sleeve 13. To that end, the sidewall typically defines a cylindrical cavity 35 having a varying diameter. The diameter of the cavity 35 proximate to the position of the aperture 23 is smaller than the diameter in the remaining portion of the cavity 35. It is preferred that the diameter of the cavity, proximate to the opening 21, be greater than the diameter of the cavity proximate to the top portion 17. The liner 11 has a shape generally complementary to the shape of the cavity 35. Therefore, the liner is typically cylindrical in shape with the side-section 27 defining a varying diameter. The portion of the side-section adjacent to the bulwark 33 is typically more narrow than the remaining portions of the side-section 27, excepting the channel 31. It is preferred that the bulwark 33 is coextensive with both the channel 31 and the narrow portion 37 of the side-section 27.

The liner 11 includes a plurality of inner threads 39 positioned to be complementary to the threads 41 of a stem 43 of a pneumatic valve for a standard automobile tire 45. In a final resting position upon the stem 43, the liner 11 provides the same advantages as a traditional valve cap. Typically, liner 11 is manufactured from an inexpensive polymer-based compound and protects the stem 43 from environmental hazards. The liner may include an O-ring 12 positioned to rest against the threads 41 of the valve stem in the final resting position, forming a secondary fluid-tight seal. The sleeve 13 fits over the liner 11 and freely rotates about axis 47. The reciprocating member 15 is mounted to move transverse to axis 47 and has three operating positions. In an extended position, the reciprocating member 15 is wedged against the inner surface 31c of the channel 31, which fixes both the angular and axial positions of the sleeve 13 with respect to the liner 11. The liner 11 and the sleeve 13 move as a single unit, facilitating placement and removal of the liner 11 on the stem 43. Moving the sleeve 11 and the liner 11 as a single unit also avoids separation of the liner 11 from the sleeve 13 after the assembly has been removed from the stem 43. In the retracted position, the axial displacement of the sleeve 13 with respect to the liner is unfettered, allowing complete removal of the sleeve 13 from the liner 11. With the liner 11 exposed in this fashion, it may be placed on, or removed from, the stem 43.

The intermediate, or locking, position of the reciprocating member 15 limits the axial displacement of the sleeve 13 with respect to the liner 11, while allowing the sleeve 13 to freely rotate about axis 47. In this fashion, axial displacement of the liner 11 with respect to the stem 43 is prevented. This provides a security feature which reduces the opportunity for an unauthorized individual to remove the liner 11 and sleeve 13 from the stem 43. Typically, in the intermediate position, the reciprocating member 15 is clear of both the lower 31b and inner 31c surfaces of the channel 31. However, in the intermediate position, the reciprocating member 15 may be positioned against, or spaced-apart from, the upper surface 31a. With the reciprocating member 15 resting against the upper surface 31a, axial displacement between the sleeve 13 and the liner 11 is prevented. With the reciprocating member 15 spaced-apart from the upper surface 31a, axial displacement between the sleeve 13 and the liner 11 is limited. It is preferred that the reciprocating member 15 not protrude from the outside surface of the sleeve 13, except in the retracted position.

Figure 3:
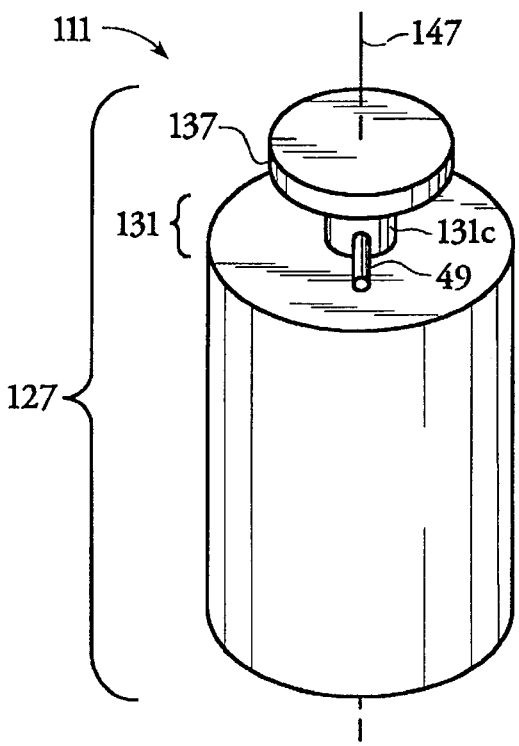
FIG. 3 is a perspective view of another embodiment of a threaded liner shown in FIGS. 1 and 2, in accord with the present invention.

Referring also to FIG. 3, another embodiment of the liner is shown, which includes a pin 49 disposed within the channel 131. The longitudinal axis of the pin 49 extends from the inner surface 131c, transverse to the longitudinal axis 147 of the liner 111, a distance shorter than the radius of the narrow portion 137 of the side-section 127. The pin 49 is positioned so that it lies along the same plane as the reciprocating member 15. The pin 49 defines a fourth operating position for the reciprocating member 15, in addition to the three operating positions mentioned above. The forth operating position is between the extended and intermediate positions mentioned above. In the fourth operating position, the reciprocating member 15 is positioned so that it comes into engagement with the pin 49. In this fashion, the liner 111 may be un-threaded from the stem 43 while limiting/preventing axial displacement between the liner 111 and the sleeve 13, and without the reciprocating member contacting the inner surface 131c. This increases the operational life of the liner 111. An additional advantage provided by the pin 49 is that it reduces the number of turns required to engage/disengage the security feature, because the distance between the intermediate and fourth positions is much less than the distance between the intermediate positions and either the extended or retracted positions.

Figure 4:
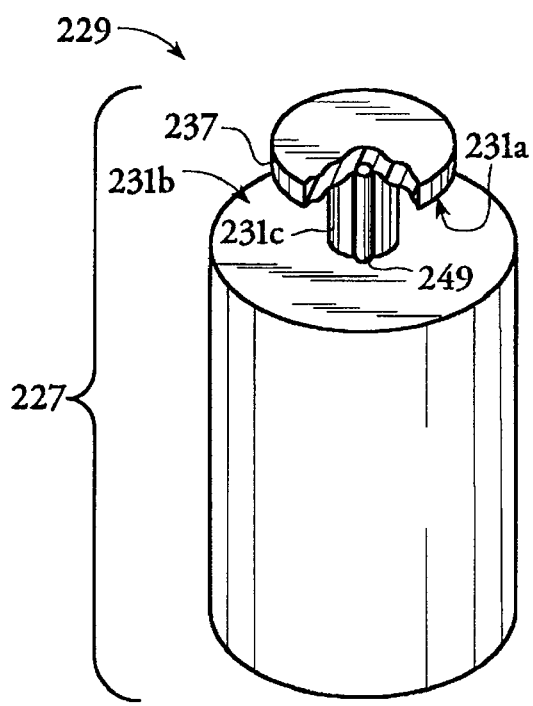
FIG. 4 is a cross-section view of another embodiment of a threaded liner shown in FIG. 3.

FIG. 4 shows an alternate embodiment of the liner 231 containing a pin 149. Similar to the embodiment shown in FIG. 3, the pin 149 extends from the inner surface 231c, a distance shorter than the radius of the narrow portion 237 of the side section 226. The longitudinal axis of the pin 149 extends, however, parallel to the longitudinal axis 247 of the liner 211. In this manner, the pin 149 extends completely across the inner surface 231c, between the upper 231a and lower 231b surfaces. As before, the pin 149 provides a fourth operating position, as well as the same advantages described above with respect to FIG. 3. A key advantage in this embodiment over the embodiment shown in FIG. 3 is that the alignment of the reciprocating member with the pin 149 is relaxed.

Figure 5:
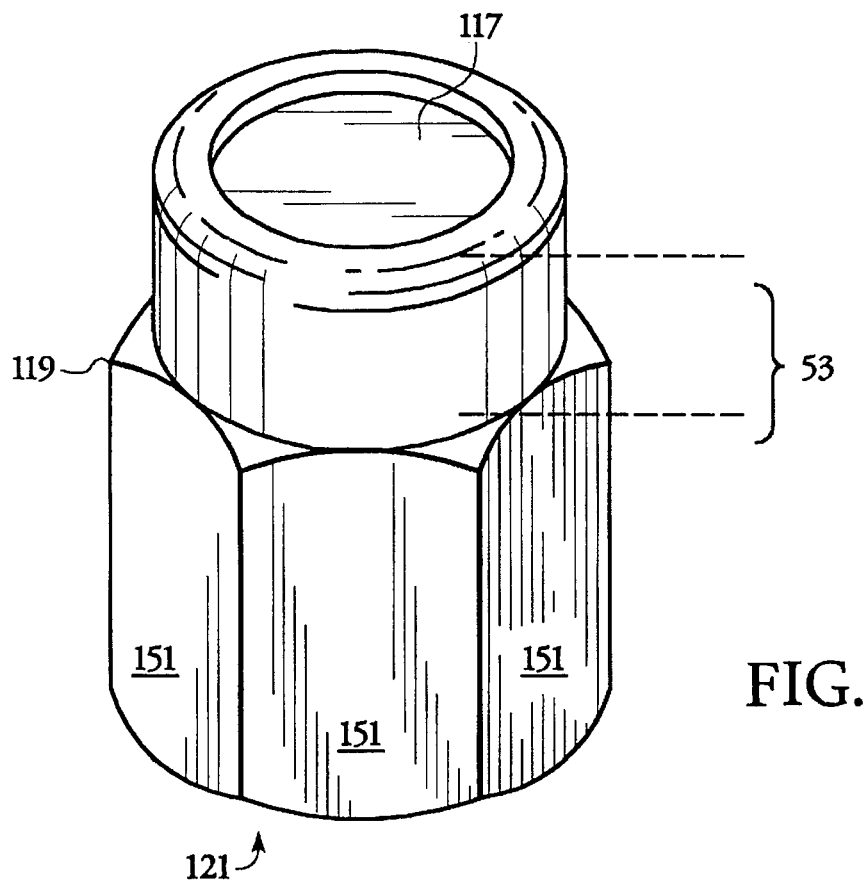
FIGS. 5-7 are perspective views of alternate embodiments of a sleeve shown in FIGS. 1-3, in accord with the present invention.
Figure 6:
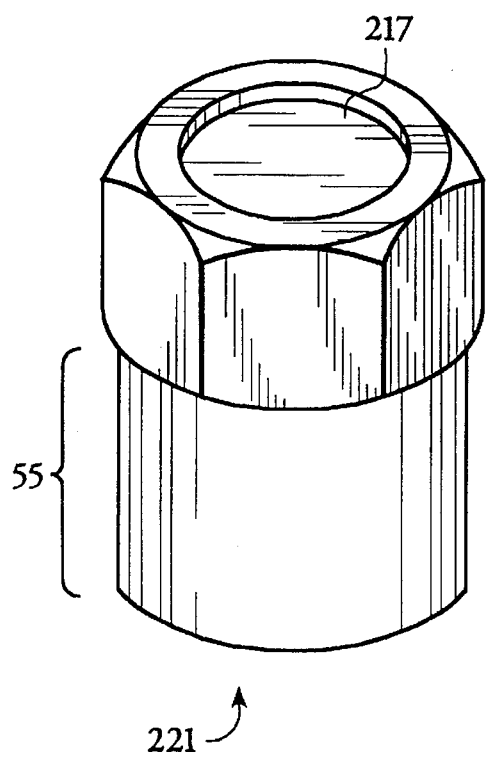
Figure 7:
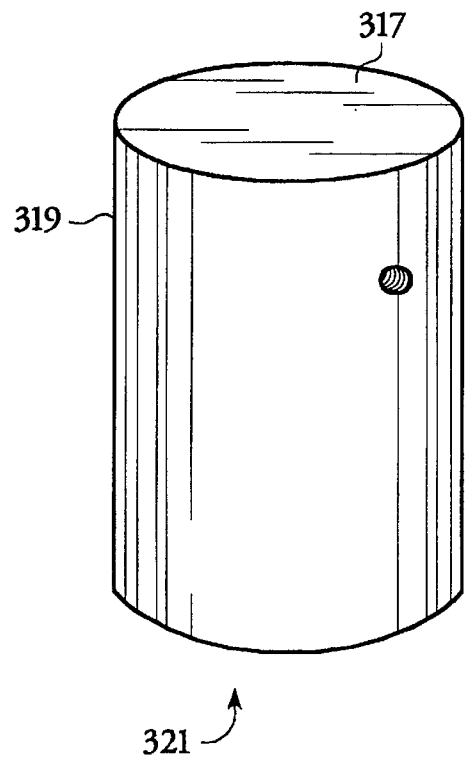

Although FIG. 1 shows the sleeve 13 as including a plurality of flats 51, extending along the entire length of the sidewall 19, the sidewall may be of virtually any shape. FIG. 5 shows the sidewall 119 as including a cylindrical segment 53 proximate to the top portion 117 with a plurality of flats 151 extending from the cylindrical segment, terminating proximate to the opening 121. FIG. 6 shows the sidewall 219 as including a cylindrical segment 55 proximate to the opening 221, with a plurality of flats 251 extending from the cylindrical segment 55, terminating proximate to the top portion 217. FIG. 7 shows the sidewall 319 formed as a cylinder having a uniform diameter over its entire length, as defined between the top portion 317 and the opening 321.

Figure 8:
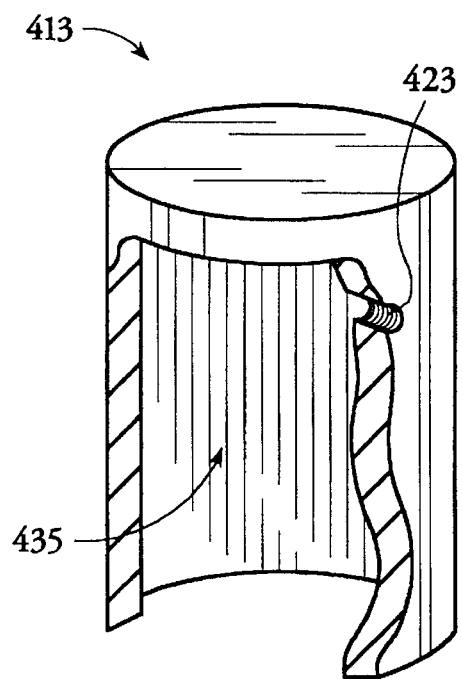
FIG. 8 is a cross-sectional view of the sleeve shown in FIG. 7.
Figure 9:
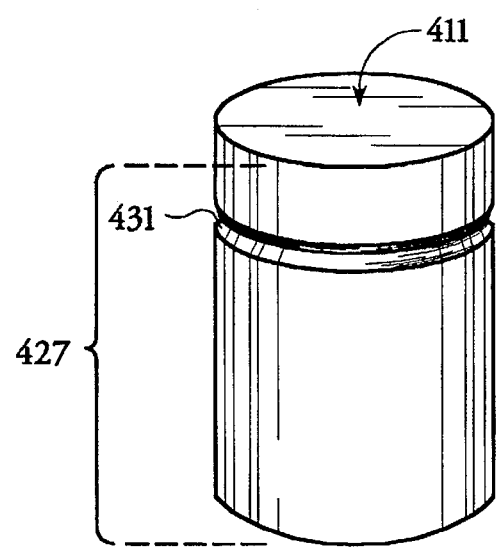
FIG. 9 is a perspective view of another embodiment of a threaded liner shown in FIGS. 1 and 2, in accord with the present invention.

FIGS. 8 and 9 show another embodiment of the present invention where liner 411 has a side-section 427 that includes a channel 431. The side-section 427 typically defines a uniform diameter over the length of the side-section 427, excepting the channel 431. The cavity 435, defined by the sleeve 413, typically has a profile complementary to the liner 411. Therefore, the cavity 435 is cylindrical, having a uniform diameter over its length. A reciprocating member (not shown) is positioned within an aperture 423 of the sleeve 413 and operates in the manner described above with respect to FIGS. 1 and 2.

Figure 10:
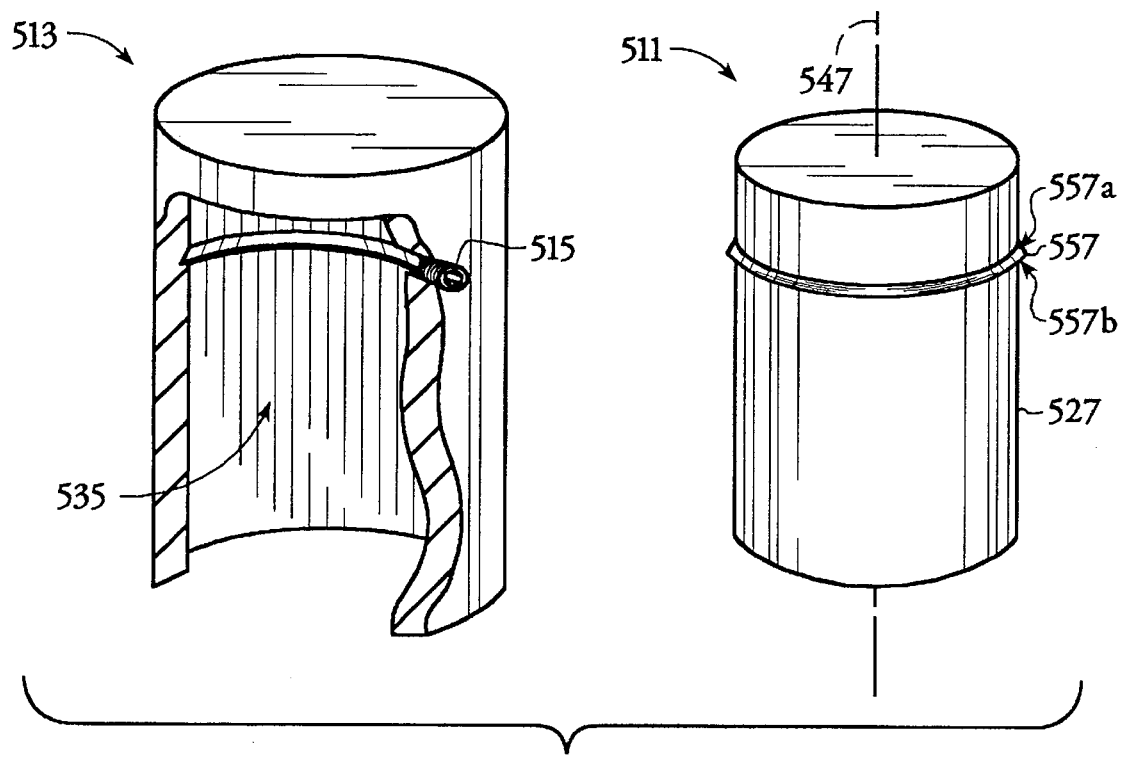
FIG. 10 is a perspective view of the invention of FIG. 1, in accord with an alternate embodiment.

FIG. 10 is another embodiment of the present invention where the liner 511 is cylindrical, having an annular ridge 557 integrally formed with the side-section 527. Excepting the annular ridge 557, the side-section 527 defines a generally uniform diameter over the length of the liner 511. The cavity 535 of the sleeve 513 has a profile complementary to the liner 511 and includes an annular groove 531 to receive the annular ridge 557. Although not necessary, a reciprocating member 515 may be positioned so as to selectively wedge against the annular ridge 557. However, the reciprocating member 515 may be positioned so that it may selectively wedge against any portion of the side section 527. The liner 511 is positioned in the cavity 535. The annular ridge 557 snaps into the annular groove 531, placing the sleeve 513 and the liner 511 in snapping engagement. The upper portion 557a of the annular ridge is typically angled to extend outwardly and downwardly toward the orifice 529. The lower portion 557b typically extends normal from the side-section 527. This facilitates snapping engagement, but greatly hinders disengagement. In this fashion, the sleeve 513 is free to rotate about the longitudinal axis 547 of the liner 511, while the axial displacement between the liner 511 and sleeve 513 is limited/prevented. The reciprocating member 515 may be selectively placed so that it wedges against the annular ridge 557, resulting in the sleeve 513 and the liner 511 to rotate as a single unit. This allows the sleeve 513 and the liner 511 to be placed on, or removed from, a valvestem of a tire in the same fashion as described above with respect to FIGS. 1 and 2, with the reciprocating member 15 in the extended position.

Figure 11:
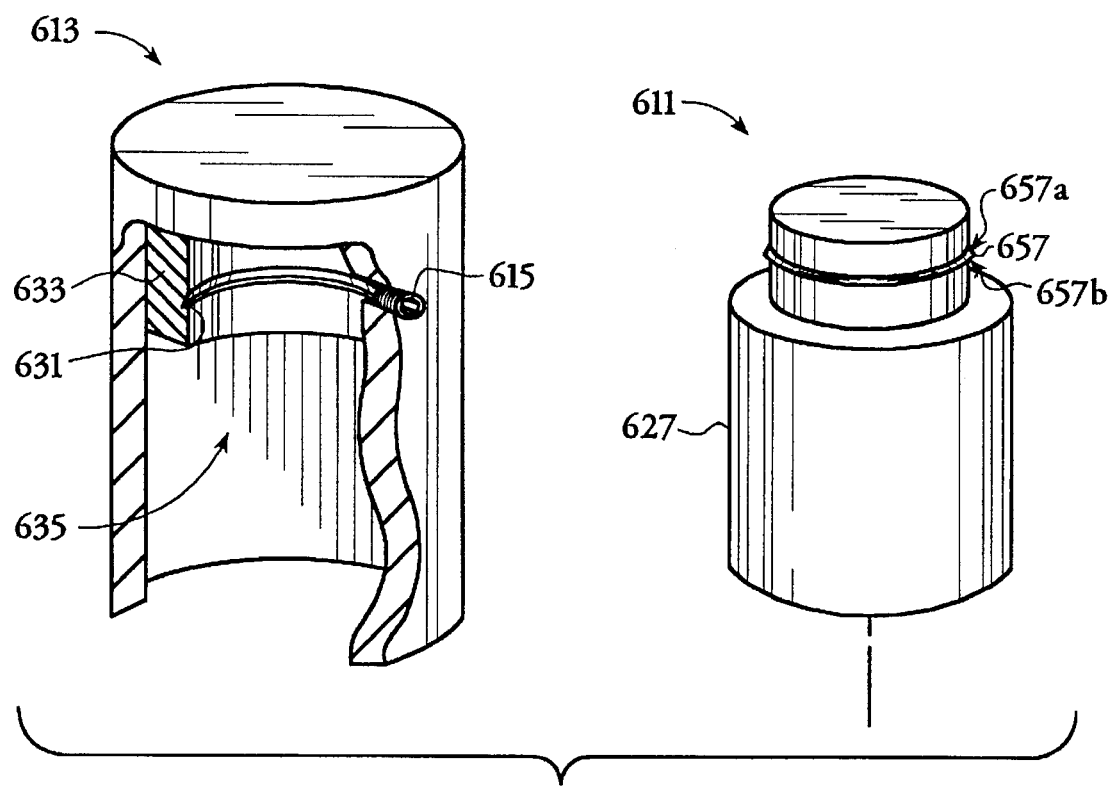
FIG. 11 is a perspective view of the invention of FIG. 10, in accord with an alternate embodiment.

FIG. 11 is an alternate embodiment shown in FIG. 10. Similar to the preferred embodiment, discussed above with respect to FIGS. 1 and 2, the sidewall 619 here defines a cylindrical cavity 635 having a varying diameter so that the portion 633 of the sidewall 619 supporting the reciprocating member 615 is thicker than the remaining portions of the sidewall 619, forming a bulwark 633. The bulwark 633 includes an annular groove 631 lying in the same plane as the reciprocating member 615. The liner 611, therefore, is cylindrically shaped with the side-section 627 defining a varying diameter. The portion of the side-section adjacent to the bulwark 633 is more narrow than the remaining portions of the side-section 627, and includes an annular ridge 657 to be received into the annular groove 631 once the liner 611 is fitted into the cavity 635 of the sleeve 613.

FIG. 12 shows yet another embodiment of the invention shown in FIG. 2 wherein bulwark 733 of the sleeve 713 includes a groove 734. The liner 711 typically has a shape complementary to the shape of the sleeve 713. To that end, the portion of the side-section 727 adjacent to the groove 734, the top portion 725, is shaped to be received therein. Similar to the groove-and-channel arrangement shown in FIGS. 10 and 11, the sleeve 713 and liner 711 are in snapping engagement, with the top portion 725 fitted into the groove 734. The upper portion 725a of the top portion is typically angled outwardly and downwardly toward the orifice 729. The lower portion 725b typically extends normal from the inner surface 731c. This facilitates snapping engagement, but hinders disengagement. In this fashion, the sleeve 713 is free to rotate about the longitudinal axis 747 of the liner 711, while the axial displacement between the liner 711 and the sleeve 713 is limited/prevented.

As discussed above with respect to FIGS. 1 and 2, the reciprocating member 715, in FIG. 12, is mounted to move transverse to axis 747 and has three operating positions. In an extended position, the reciprocating member 715 is wedged against the inner surface 731c of the channel 731, which fixes both the axial and angular positions of the sleeve 713 with respect to the liner 711. In the retracted position, the axial displacement of the sleeve 713 with respect to the liner 711 is unfettered, allowing complete removal of the sleeve 713 from the liner 711. Finally, the intermediate, or locking, position of the reciprocating member 715 limits the axial displacement of the sleeve 713 with respect to the liner 711, while allowing the sleeve to freely rotate about the axis. Typically, in the intermediate position, the reciprocating member 715 is clear of both the lower 731b and inner 731c surfaces of the channel 731.

FIG. 13 shows a detailed view of a reciprocating member 715 having a cavity 717 typically configured to fit an Allen wrench 719. It is preferred to utilize a common-type set-screw, such as an Allen screw shown in FIG. 13, in the present invention to reduce costs. Any type of common set-screw may be employed, for example, torque-heads, flat heads and box-heads. Nonetheless, added security may be provided by having a keyed-cavity, shown in FIG. 14. The cavity includes a plurality of sides 721 which are arbitrarily arranged. The sides are typically both flat and round. The reciprocated member is turned via a key 727. The key 727 has sides 729 which are complimentary to the sides 721 of the cavity. In this manner, the reciprocating member may be uniquely associated with a key member, further reducing the possibility that the sleeve and liner may be removed for the tire valve-stem.

I claim:

1. A cap for a threaded valve, said cap comprising:

an internally threaded cylindrical liner having a longitudinal axis and a top portion having a crown surface, the entire area of which is planar, with the threads of said liner being adapted to fit corresponding threads of said valve, a sleeve positioned coaxial with said liner and in rotational relation therewith, about said axis, said sleeve including a closed end and a sidewall extending therefrom terminating in an opening, said closed end having an inside surface, the entire area of which is planar and adapted to seat proximate to said planar crown surface, and means, positioned within said aperture, for selectively limiting both axial and rotational displacement between said liner and said sleeve.

2. The valve cap as recited in claim 1 wherein said limiting means includes a reciprocating member connected to said sleeve for movement transverse to said axis, and said threads are disposed within a side surface of said liner extending away from said top portion, with said reciprocating member positioned in said sidewall to engage said top portion.

3. The valve cap as recited in claim 1 wherein said top portion includes an annular channel adapted to receive said means for selectively limiting both axial and rotational displacement.

4. The valve cap as recited in claim 3 wherein said liner extends from said crown surface along said longitudinal axis defining a length and said sleeve covers said crown surface and said liner over said length.

5. The valve cap as recited in claim 4 wherein said limiting means includes a reciprocating member having a plurality of flat and round sides arbitrarily arranged, defining a key-way cavity at one end of said reciprocating member to receive a key having a complementary shape.

6. The valve cap as recited in claim 1 wherein said limiting means includes an interlocking member disposed between said liner and said sleeve, forming an interference fit therebetween to limit axial displacement between said liner and said sleeve while maintaining said rotational relationship.

7. The valve cap as recited in claim 6 wherein said sleeve includes inner and outer surfaces, said interlocking member is an annular ridge disposed about said liner and said limiting means further includes said inner surface defining an annular channel positioned to receive said ridge.

8. The valve cap as recited in claim 1 wherein said aperture extends transverse to said axis between said inner and outer surfaces and said limiting means includes a reciprocating member disposed for movement within said aperture, said reciprocating member having first and second positions with said reciprocating member located in said first position fixing both axial and angular positions between said liner and said sleeve.

9. A cap for a threaded valve comprising:

a hollow liner having a top surface which is completely planar and a side surface extending therefrom, said side surface defining outside and inside surfaces, with said inside surface including a plurality of threads adapted to fit corresponding threads of said valve, a hollow sleeve, said sleeve having a crown surface which is completely planar, and a sidewall extending therefrom with said planar crown surface disposed to face said top surface of said liner and mate closely therewith upon said sleeve being coaxially positioned and in slidable engagement with said liner, and means, coupled to extend through said sleeve and engage said liner at a point above said plurality of threads, for selectively fixing both axial and angular positions between said liner and said sleeve.

10. The valve cap as recited in claim 9 wherein said sidewall includes an aperture extending completely therethrough and said fixing means includes a reciprocating member disposed for movement within said aperture and said liner having an outer surface defining an annular channel, said reciprocating member having extended, intermediate and retracted positions with said annular channel positioned to receive said reciprocating member located in said intermediate position, thereby limiting said axial displacement between said liner and said sleeve.

11. The valve cap as recited in claim 9 wherein said sidewall includes an aperture extending completely therethrough and said fixing means includes a reciprocating member disposed for movement within said aperture and said liner having an outer surface defining an annular channel, said annular channel having an upper surface, a lower surface and an inner surface disposed between said upper and lower surfaces, said reciprocating member having extended intermediate and retracted positions with said inner surface positioned to wedge against said reciprocating member when located in said extended position.

12. The valve cap as recited in claim 11 further including a pin extending from said inner surface defining a fourth position located between said extended and said intermediate positions, whereby said reciprocating member is adapted to securely contact said pin.

13. The valve cap as recited in claim 9 wherein said liner includes an annular channel adapted to receive said means for selectively fixing both axial and angular position between said liner and said sleeve.

14. A cap for use with a standard threaded pneumatic tire stem valve, comprising:

an internally threaded liner for threaded engagement with said standard pneumatic tire stem valve, said liner having a top portion with a crown surface, the entire area of which is completely planar, and a side surface extending therefrom, said side surface defining outside and inside surfaces, with said inside surface including a plurality of threads, a sleeve coaxially positioned and in rotational relation with said liner, said sleeve including a closed end and a sidewall extending therefrom, terminating in an opening, said closed end having an inside surface, the entire area or which is completely planar and disposed to face said planar crown surface of said liner and mate closely therewith, and means, positioned in said sleeve to engage said top portion, for selectively preventing axial displacement of said liner with respect to said standard pneumatic tire stem valve.

15. The valve cap as recited in claim 14 wherein said preventing means includes a reciprocating member connected to said sleeve for movement transverse to said axis and said liner having an outer surface defining an annular channel, said annular channel having an upper surface, a lower surface and an inner surface disposed between said upper and lower surfaces, with said reciprocating member having extended, intermediate and retracted positions with said reciprocating means in said intermediate position fitting against said upper surface while remaining clear of both said lower and inner surfaces to prevent said axial displacement between said liner and said sleeve while maintaining said rotational relationship.

16. The valve cap as recited in claim 15 wherein said reciprocating member includes a plurality of flat and round sides arbitrarily arranged, defining a key-way cavity at one end of said reciprocating member to receive a key having a complementary shape.

17. The valve cap as recited in claim 14 wherein said sidewall includes an aperture extending completely therethrough and said fixing means includes a reciprocating member disposed for movement within said aperture and said liner having an outer surface defining an annular channel, said annular channel having an upper surface, a lower surface and an inner surface disposed between said upper and lower surfaces, with said reciprocating member having extended intermediate and retracted positions with said inner surface positioned to wedge against said reciprocating member located in said extended position, thereby fixing both axial and angular positions between said liner and said sleeve.

18. The valve cap as recited in claim 14 wherein said preventing means includes an interlocking member disposed between said liner and said sleeve, forming an interference fit therebetween to limit axial displacement between said liner and said sleeve while maintaining a rotational relationship therebetween.

19. The valve cap as recited in claim 18 wherein said sleeve includes inner and outer surfaces, said interlocking member is an annular ridge disposed about said liner and said preventing means further includes said inner surface defining an annular channel positioned to receive said ridge.

\* \* \* \* \*